D. Edwards,
Alarm Lock.
Nº 1,722.    Patented Aug. 12, 1840.
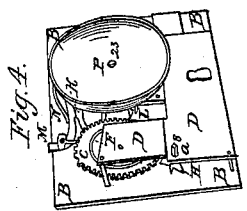
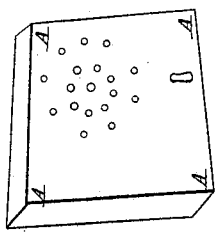
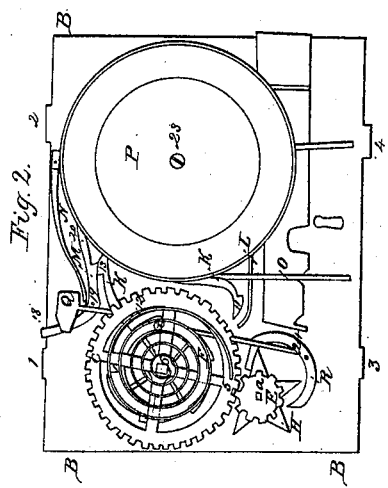
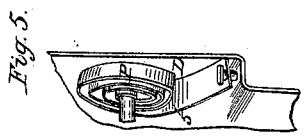
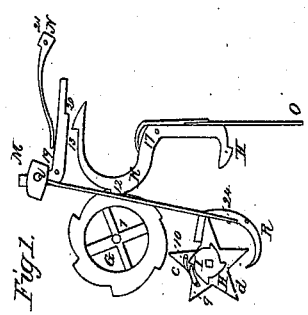

UNITED STATES PATENT OFFICE.

DAVID EDWARDS, OF MORGAN COUNTY, OHIO.

ALARM-LOCK FOR DOORS TO PREVENT BURGLARY.

Specification of Letters Patent No. 1,722, dated August 12, 1840.

*To all whom it may concern:*

Be it known that I, DAVID EDWARDS, of Morgan county, in the State of Ohio, have invented a new and useful Alarm Designed to Act in Connection with a Door or Other Lock; and I hereby declare that the following is a full and exact description thereof, reference being had to the annexed drawings, which form a part of this specification.

The nature of my invention consists in employing two cogged wheels, the larger called the spring wheel and the smaller the pinion wheel, connected with which is the escape wheel and a kind of pallet to act on the escape wheel and a hammer and handle similar to that of a clock acting on a bell. There is also a spiral or volute spring wound around the spring wheel shaft, and at the opposite end of the spring wheel shaft is a ratchet wheel, connected with which is a dog to hold the spring wheel as it is wound up, and also a catch to act into the dog when thrown out of gear, holding it out until the alarm has run down or exhausted the spring at one end of the pinion is the escape wheel, against which is a small ratchet, a dog, and spring, so connected as to let the escape wheel stand still while the alarm is wound up, and to hold it when it runs down, when connected with the lock one end of the dog is brought in contact with the spring which is connected with the bolt of the lock, so that after the alarm is wound up, it may be locked without setting off the alarm, but when it is unlocked will start the alarm, nor can it be stopped by relocking.

To enable others skilled in the art, to make and use my invention I will proceed to describe its construction and operation.

Construct the case A, Figure 3, nearly in the shape of other locks on the inner or back side of which is the plate B, Figs. 2 and 4 which when fastened on the case A, Fig. 3, at 1, 2, 3, and 4 forms an inclosed box. On the inner side of plate B, are fastened all the works.

The spring wheel C, Figs. 2 and 4, is made after the form of common cogged wheels, and held between the plates B, and D, Fig. 4, by its pivots. The pinion wheel E, Fig. 2, is made to contain about one fifth the number of cogs that are in the spring wheel C, and is geared into said spring wheel and held also by its pivots between the plates B and D, Fig. 4, one end of the mainspring F, Figs. 2 and 4, is fastened to the plate D, Fig. 4, by a screw or rivet passing through the plate and spring coil, 5, Figs. 4 and 5, and the other end at the shaft of the spring wheel as at 6, Figs. 2, 4 and 5. The large ratchet wheel G, Figs. 1 and 2, is fastened on the shaft at the spring wheel as seen 7, Fig. 1, on the opposite end from the spring. The escape wheel H, Figs. 1, 2, 4, is made with five teeth; one of its pivots is inserted into the plate B, and the other into the shaft of the pinion wheel E. The pinion wheel E, before spoken of is held by its pivot *a* to the plate D, at the point 8, Fig. 4, which point also forms the shaft on which the key is fixed for winding it up at 8, and the other end of the pinion wheel is held by a pivot of the escape wheel H, which is made round and inserted into the end of the shaft of the pinion wheel, by which means the escape wheel H stands still while winding up, and the said pinion is geared into the spring wheel at the point 5. The small ratchet wheel *i* is fastened to the end of the pinion E, firmly, but the dog and springs 9 and 10, which act into it are fastened on the escape wheel H, Fig. 1. The dog K, has three notches in it at 11, 12, and 13, the one to be acted on the spring L of the lock at 11, of Fig. 2, and one at the large ratchet at 12, and one at the catch M, at 13, and the said dog is fastened so as to play at the pivot 17. One end of the catch M is made to pass through the case at 18 and plays on the pivot at 19, and has a notch at 20 for the purpose of holding the dog out of gear when thrown out by the spring of the lock L, that the alarm may be run down. The spring of the catch M, is fastened to the plate B at 21, and the dog spring is fastened to the cheek O, at 22. The bell P is fastened to the plate B, at 23, by a screw. The hammer and handle Q are attached to the pallets R, at 24.

This alarm lock may be fastened on a door like an ordinary lock, that I may protect the house from being entered by false keys without detection; I take a key made after the form of a clock key, and wind up the alarm. After which I may lock the door inside or outside; if a key is inserted and the door unlocked before the bolt is fully drawn back the alarm is started by the spring L, of the lock pressing against the notch 11, of the dog K, throwing it out of the notch 13, and into the notch of the catch at 20, which catch holds the dog thus thrown out until the alarm runs down, and is made to strike from one to three hundred times.

What I claim as my invention and desire to secure by Letters Patent is—

1. The combination of an alarm with a door or other lock, by means of the dog and spring attached to the bolt as hereinbefore described;

2. I also claim the combination of the dog K, the ratchet wheel G and the catch M, in combination with the spring wheel C, the pinion E, the spring L, the escape wheel H, the pallets R, the hammer and handle Q, and the bell P, for the purposes and in the manner hereinbefore described.

DAVID EDWARDS.

Witnesses:
ELI DEAVER,
H. N. THISSELL.